(12) United States Patent
Zhang et al.

(10) Patent No.: US 10,848,093 B2
(45) Date of Patent: Nov. 24, 2020

(54) ELECTRICAL POWER STEERING WITH TWO CONTROLLERS USING UNIFORM STEERING ANGLE CONTROL

(71) Applicant: STEERING SOLUTIONS IP HOLDING CORPORATION, Saginaw, MI (US)

(72) Inventors: Xingye Zhang, Saginaw, MI (US); Kai Zheng, Midland, MI (US); Chethan Narayanaswamy, Auburn Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/117,272

(22) Filed: Aug. 30, 2018

(65) Prior Publication Data

US 2020/0076343 A1 Mar. 5, 2020

(51) Int. Cl.
*H02P 23/12* (2006.01)
*B62D 5/04* (2006.01)

(52) U.S. Cl.
CPC .......... *H02P 23/12* (2013.01); *B62D 5/0463* (2013.01); *H02P 2205/05* (2013.01)

(58) Field of Classification Search
CPC ..... H02P 27/06; H02P 20/032; A61M 1/1086; A61M 1/122; A61M 1/127
See application file for complete search history.

(56) References Cited

U.S. PATENT DOCUMENTS

| | | |
|---|---|---|
| 4,882,586 A | 11/1989 | Dolph et al. |
| 5,635,807 A | 6/1997 | Lautzenhiser |

(Continued)

FOREIGN PATENT DOCUMENTS

| | | |
|---|---|---|
| DE | 10114206 A1 | 11/2001 |
| DE | 102005062868 A1 | 7/2007 |

(Continued)

OTHER PUBLICATIONS

English Translation of German Office Action for German Application No. 102017113118.3 dated Mar. 28, 2018, 8 pages.

*Primary Examiner* — Zoheb S Imtiaz
(74) *Attorney, Agent, or Firm* — Dickinson Wright PLLC

(57) ABSTRACT

According to one or more embodiments, a motor control system includes a first controller computing a first torque command using a first closed loop. The motor control system further includes a second controller computing a second torque command using a second closed loop. Both, the first controller and the second controller, compute the respective first torque command and the second torque command using a uniform calculation in which a pseudo/leaky integrator $$\frac{Ki}{s+\varepsilon}$$

in s domain (s is Laplace variable) is used and integrator state is calculated as $Ki*\int_0^t e(\tau)\exp(\varepsilon\tau-\varepsilon t)d\tau$, in time domain, which is implemented by discretization methods in electric control unit (ECU), where e is a tracking error, Ki is a predetermined integral parameter, and $\varepsilon$ is a configurable parameter. The motor control system further includes a motor that receives a torque command for generating corresponding amount of torque based on the first torque command and the second torque command.

20 Claims, 5 Drawing Sheets

(56) References Cited

U.S. PATENT DOCUMENTS

| | | | |
|---|---|---|---|
| 6,014,000 A | 1/2000 | Gutierrez | |
| 6,381,528 B1 | 2/2002 | Kawada et al. | |
| 6,687,590 B2 | 2/2004 | Kifuku et al. | |
| 7,019,486 B1 | 3/2006 | Kifuku et al. | |
| 7,154,244 B2 | 12/2006 | Asaumi et al. | |
| 8,018,193 B1* | 9/2011 | Pekarek | H02P 21/13 318/611 |
| 8,084,972 B2 | 12/2011 | Strong et al. | |
| 8,548,681 B2 | 10/2013 | Kushiro et al. | |
| 8,650,440 B2 | 2/2014 | Rohleder et al. | |
| 8,751,710 B2 | 6/2014 | Fowler | |
| 8,983,727 B2* | 3/2015 | Kifuku | H02P 29/02 701/42 |
| 9,231,465 B2 | 1/2016 | Hara | |
| 2002/0093298 A1 | 7/2002 | Walter | |
| 2004/0148080 A1 | 7/2004 | Ekmark et al. | |
| 2006/0042858 A1 | 3/2006 | Boyle et al. | |
| 2010/0231158 A1* | 9/2010 | Jonsson | H02P 5/46 318/609 |
| 2011/0241586 A1* | 10/2011 | Tobari | H02P 21/06 318/400.23 |
| 2012/0112678 A1* | 5/2012 | Huang | F04D 27/004 318/471 |
| 2012/0130674 A1 | 5/2012 | Fisher et al. | |
| 2015/0022137 A1* | 1/2015 | Maeda | G05B 13/021 318/632 |
| 2015/0091481 A1 | 4/2015 | Tago et al. | |
| 2015/0375780 A1 | 12/2015 | Chai et al. | |
| 2016/0006387 A1* | 1/2016 | Nakamura | H02P 25/22 701/43 |
| 2016/0142003 A1* | 5/2016 | Scotson | H02P 6/10 180/446 |
| 2016/0149523 A1* | 5/2016 | Yoshiura | G05B 11/42 318/432 |
| 2016/0173020 A1 | 6/2016 | Kanekawa et al. | |
| 2016/0303485 A1* | 10/2016 | Kawamura | G05D 1/0011 |
| 2016/0315577 A1 | 10/2016 | Suzuki | |
| 2017/0033725 A1* | 2/2017 | Koseki | H02P 27/08 |
| 2017/0361869 A1* | 12/2017 | Hales | B62D 5/0463 |
| 2019/0149077 A1* | 5/2019 | Sumasu | H02P 21/14 318/400.02 |

FOREIGN PATENT DOCUMENTS

| | | |
|---|---|---|
| EP | 1456720 B1 | 11/2007 |
| WO | 03050624 A1 | 6/2003 |

* cited by examiner

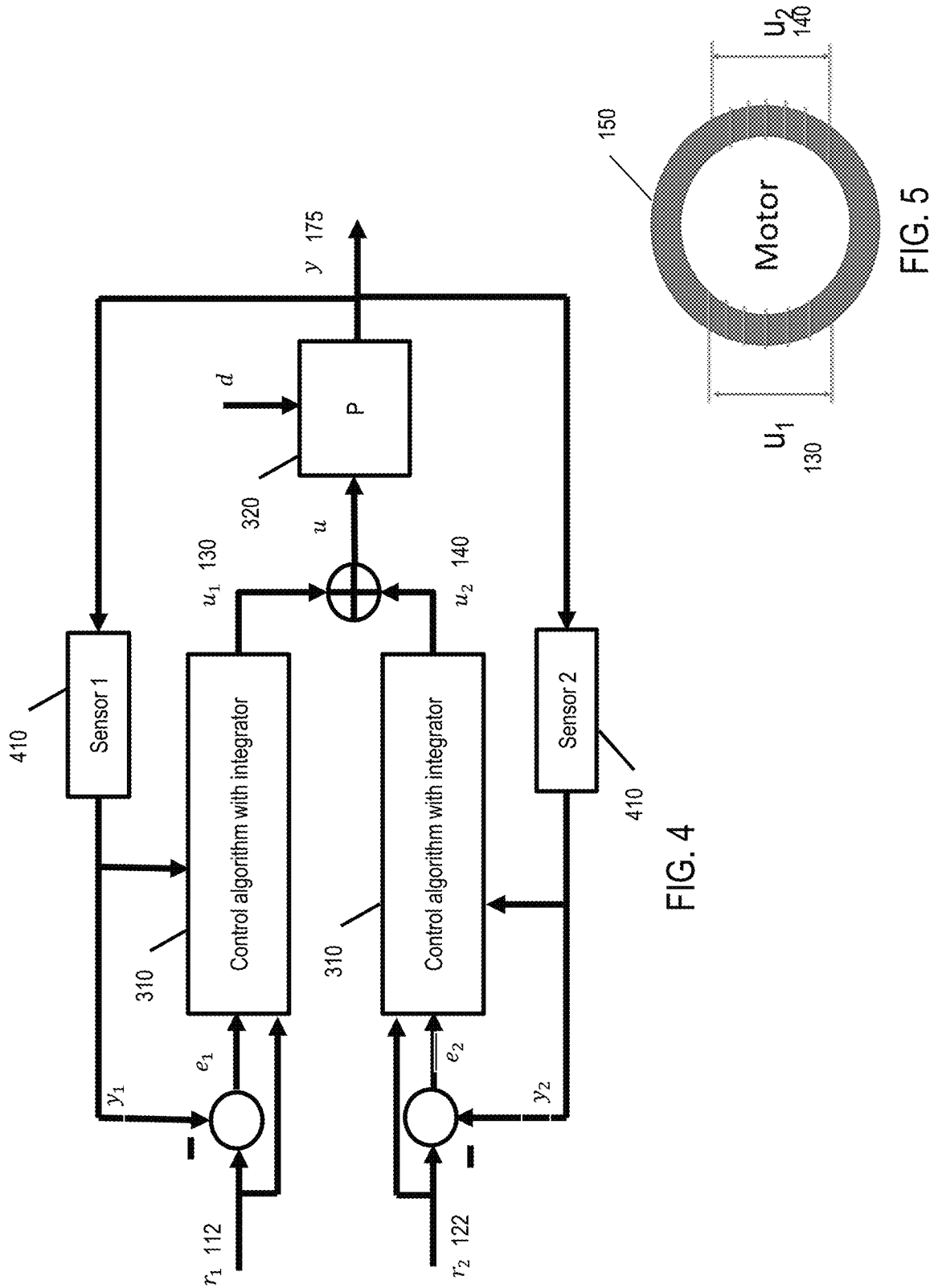

ELECTRICAL POWER STEERING WITH TWO CONTROLLERS USING UNIFORM STEERING ANGLE CONTROL

BACKGROUND

An electrical power steering (EPS) system can include two controllers operating using closed-loop control that includes integral action for redundancy. The two independent controllers improve reliability of the EPS by independently calculating redundant motor control commands. Each command in turn controls a motor winding in a motor on a common shaft. One specific example is using a dual-wound motor. While the intent is for each of the two controllers to calculate the same control command, differences in sensor readings and latency between controller operating times lead to differences in calculated commands. Further when performing closed-loop control (such as controlling a measured motor position to a commanded motor position), the two controllers may end up with different values on integrator states, leading to large difference in control commands, and thus, inefficiencies.

SUMMARY

According to one or more embodiments, a motor control system includes a first controller computing a first torque command using a first closed loop. The motor control system further includes a second controller computing a second torque command using a second closed loop. Both, the first controller and the second controller, compute the respective first torque command and the second torque command using a uniform calculation in which one or more pseudo/leaky integrator states are calculated as $Ki*\int_0^t e(\tau)\exp(\in\tau-\in t)d\tau$, e is a tracking error, Ki is a predetermined integral parameter, and ε is a configurable parameter. In s domain, it can be written as $$\frac{Ki}{s+\epsilon},$$

where s is the Laplace variable. The motor control system further includes a motor that generates corresponding amount of torque based on the first torque command and the second torque command.

According to one or more embodiments, a method for operating a motor control system that has two or more controllers includes receiving, by a first controller, a first input for computing a first torque command. The method further includes receiving, by a second controller, a second input for computing a second torque command. The method further includes computing, by both the first controller and the second controller, the respective first torque command and the second torque commands using a uniform calculation in which one or more pseudo/leaky integrator states are calculated as $Ki*\int_0^t e(\tau)\exp(\in\tau-\in t)d\tau$, e is a tracking error, Ki is a predetermined integral parameter, and E is a configurable parameter. In s domain, it can be written as $$\frac{Ki}{s+\epsilon},$$

where s is the Laplace variable. The method further includes generating, by a motor, a corresponding amount of torque based on a torque command using the first torque command and the second torque command.

According to one or more embodiments, an electric power steering system includes a motor configured to generate an assist torque. The electric power steering system further includes a first controller to generate a first control output for the motor using a first closed-loop control loop to generate the assist torque. The electric power steering system further includes a second controller to generate a second control output for the motor using a second closed-loop control loop to generate the assist torque, both the first controller and the second controller computing the respective first control output and the second control output using a uniform calculation in which one or more pseudo/leaky integrator states are calculated as $Ki*\int_0^t e(\tau)\exp(\in\tau-\in t)d\tau$, e is a tracking error, Ki is a predetermined integral parameter, and ε is a configurable parameter. In s domain, it can be written as $$\frac{Ki}{s+\epsilon},$$

where s is the Laplace variable.

These and other embodiments, advantages, and features will become more apparent from the following description taken in conjunction with the drawings.

BRIEF DESCRIPTION OF THE DRAWINGS

The subject matter which is regarded as the technical solutions is particularly pointed out and distinctly claimed in the claims at the conclusion of the specification. The foregoing and other features, and advantages of the technical solutions are apparent from the following detailed description taken in conjunction with the accompanying drawings in which:

FIG. 4 shows a diagram of a redundant controller system including two ECUs and two sensors according to one or more embodiments;

FIG. 5 shows a depiction of a motor mechanically generating torque corresponding to input commands from two ECUs according to one or more embodiments.

DETAILED DESCRIPTION

Figure 1:
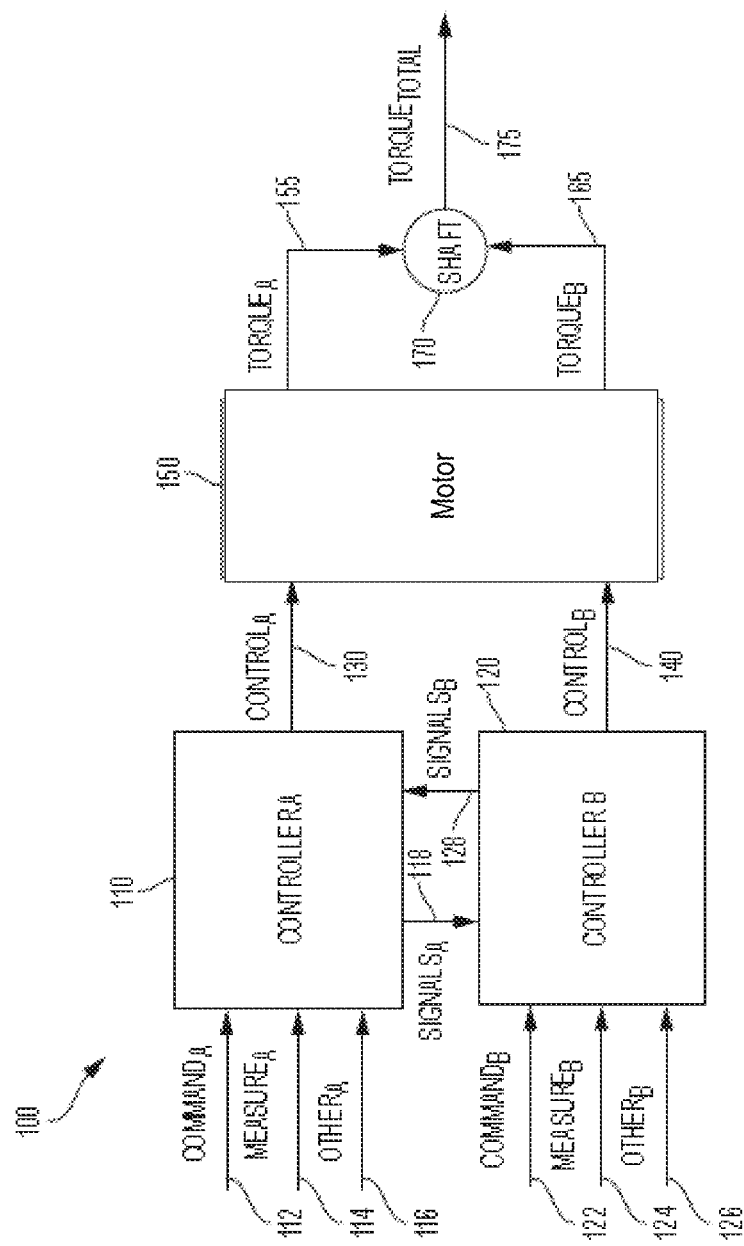
FIG. 1 illustrates an example layout of a motor control system in accordance with one or more examples.

The technical solutions described herein are applicable in electric machines, particularly motor control systems that include two or more controllers that redundantly operate a motor. A motor control system described herein can be part of a system such as an electric power steering (EPS) system, or any other system that includes two controllers independently performing a closed-loop process control, such as pumps, heaters, and the like. The technical solutions herein are described using examples of a two-motor system, such as an EPS system with two motors to provide assist torque.

However, the technical solutions described herein are applicable in other applications where two independent controllers are used for continually measuring process variables such as temperature, pressure, level, flow and concentration—and taking actions such as opening valves, slowing down pumps and turning up heaters—so that the measured process variables are maintained at specified set point values, such as predetermined values or operator provided input values. In one or more examples, the two controllers may be used to provide redundancy. Accordingly, although the technical solutions are described herein using an EPS system as an example of such an electrical machine, it should be noted that the technical solutions are applicable elsewhere in other examples.

The EPS plays a vital role in the advanced driver assist system (ADAS) or autonomous driving. In autonomous driving, the EPS system provides desired motor torque command to control a steering angle to follow a target angle generated from path planning. Further, in a Steer-By-Wire type EPS system, a mechanical connection between column and rack is replaced by electronic signals. The rack together with road wheels is connected to an electric motor, referred to as road wheel actuator, which generates a motor torque to drive the rack and road wheel assembly to follow the corresponding steering wheel angle or column angle.

To meet the safety requirements of autonomous driving, the EPS system and/or the road wheel actuator in Steer-By-Wire type EPS, is designed with redundancy so that the system contains independent dual sensors, motor windings, and Electronic Control Units (ECU).

There are two main architectures of dual ECU redundant system: Master-Master and Master-Slave. In Master-Master, both ECUs calculate and execute their respective motor torque commands and the final motor torque is the summation of those two in the motor.

In Master-Slave, the master ECU calculates motor torque commands for both ECUs and sends out the slave torque command for execution by the slave ECU. The two ECUs communicate through inter-micro communication (IMC). When master ECU fails, it stops commanding motor torque and slave ECU takes over and starts calculating its own command(s).

Compared with Master-Master, the Master-Salve architecture requires faster IMC between two ECUs to transmit torque command and is more sensitive to the quality of the IMC. The Master-Master control strategy is more robust against IMC speed and communication error. However, the challenge with Master-Master is that because both ECUs calculate their respective torque commands, it is possible for the two independently calculated torque commands to become out of phase or even opposite to each other leading to an unstable system.

Figure 2:
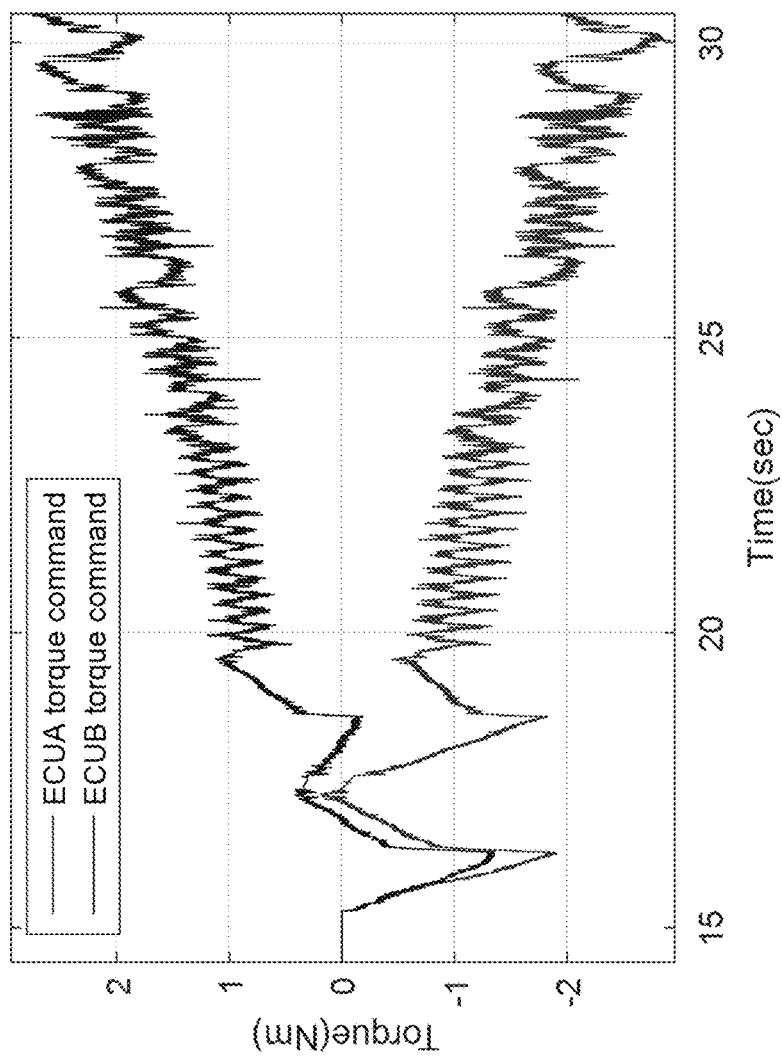
FIG. 2 shows an example of the above described case of an unstable system using a control algorithm that is typically stable for a single ECU operation.

FIG. 1 illustrates an example layout of a motor control system 100 with two controllers, according to one or more embodiments, and FIG. 2 shows an example of the above described case of an unstable system using a control algorithm that is typically stable for a single ECU operation. The instability is due to a combination of using integrator in control algorithm, mismatching sensors, and asynchronous operation between the two ECUs which will be addressed in detail by the technical solutions described herein.

It should be noted that the technical solutions will be described with reference to specific examples, without limiting same. The technical solutions described herein include an architecture and methods for optimizing performance of a motor control system with two controllers being used to perform closed-loop control, such as an EPS system or any other motor control system.

FIG. 1 illustrates an example layout of a motor control system 100 with two controllers, according to one or more embodiments. It should be noted that although FIG. 1 and the other examples described herein use two controllers, the technical solutions described herein are applicable in other embodiments with more than two controllers. The controllers may be process controllers like proportional, integral, derivative (PID) controllers, or any control algorithms that have an integrator (I).

Referring to FIG. 1, a controller-A 110 runs independently of a controller-B 120, in a master-master configuration. Command-A 112 is a signal that is received from an external system to have the motor control system 100 control to perform an operation. For example, in case of the EPS system, the external system may be a vehicle controller unit that may request a commanded motor position, motor velocity, torque, or the like. A redundant and independent version of the command is also sent to the controller-B 120, labeled command-B 122 in FIG. 1. To perform the closed-loop control, the controller-A 110 receives a measurement corresponding to the command-A 112, referred to as measure-A 114. Independently, for performing a closed-loop control, the controller-B 120 receives a redundant and independent measurement, referred to as measure-B 124. Additional redundant and independent signals that affect system behavior are also identified as being sent to both controllers as part of the other-A 116 and other-B 126.

In one or more examples, the command-A 112 and the command-B 112, while intended to be the same, may be different. FIG. 2 shows an example of such case with a control algorithm that is stable on single ECU operation. This is due to a combination of using integrator in control algorithm, mismatching sensor, and asynchronous operation between the two ECUs.

For example, the command-A 112 is to control the motor 150 shaft angle to 10 degrees and the command-B 122 is to control the motor 150 shaft angle to 12 degrees. Alternatively, or in addition, the measure-A 114 and the measure-B 124 may have different values from each other. For example, the measure-A 114 may be a motor angle, or any other measurement that is measured by a first sensor, while the measure-B 124 may be the motor angle (or any other measurement) that is measured by a second sensor. The two sensors used for the measurements can have non-trivial differences, for example because of production errors, age of sensors, or any other such reason that cause the values of the measure-A 114 and the measure-B 124 to be different. In another example, a single sensor captures the values for the measure-A 114 and the measure-B 124, but at different time-points. For example, the measure-A 114 is captured at time T1 and the measure-B is captured at time T2 (or vice-versa). Capturing the measurements at the different times introduces non-trivial differences in the measured values. It should be noted that in other examples, the commands and measurements may be different than those listed in the examples herein.

In one or more examples, the controller-A 110 generates an output control command-A 130 and the controller-B 120 generates an output control command-B 140 based on the respective input signals. Consider the case of the EPS system where, the controller-A 110 provides the control command-A 130 to a motor 150 and the controller-B 120 provides the control command-B 140 to the motor 150. A resulting output torque-A 155 from the motor and a resulting output torque-B 165 from the motor operate a shaft 170. For example, the shaft 170 may be a steering shaft that connects a handwheel of an EPS system with a rack or wheels of a vehicle, the output torques providing assistance torque to the operator of the EPS system. The assist torque facilitates an operator of a vehicle equipped with the EPS system to maneuver the vehicle. The total torque 175 applied to the shaft 170 is the sum of the output torque-A 155 and the torque-B 165. The total torque 175 represents a pinion angle in an EPS (or a rack position in Steer-By-Wire).

It is assumed that the input signals sent to the controller-A 110 and the controller-B 120 respectively have substantially the same value, resulting in substantially similar outputs from the two controllers, resulting in a balanced control of the assist torque generated by the EPS system. However, it can be appreciated that there are non-trivial differences between the input signals sent to the two controllers, and/or non-trivial processing time differences between the two controllers. The differences lead to imbalanced output from the two controllers. The technical solutions herein address the technical challenges caused by the non-trivial differences between the two sets of input signals and/or processing times of the two controllers. The type of differences in the signals that are the subject of the technical solutions herein are either constant or slowly changing over time with respect to the controller operating rate.

One of the existing solutions to stabilize Master-Master dual ECU control is through extensive IMC signal arbitration. IMC signal arbitration involves a series of steps: 1. Send signal through communication channel to the other ECU. At the same time, receive the signal transmitted from the other ECU. 2. Compare the local signal and received remote signal and calculate an offset that is half of the difference between the compared values. 3. Finally subtract the offset from the local signal to obtain the arbitrated signal. 4. Use the arbitrated signal in place of the local signal in control algorithm computation. The above steps are carried out on each ECU. Depending on the type of signals used, IMC signal arbitration can fall into two categories: measurement arbitration and state arbitration. In measurement arbitration, the arbitration offset usually depends only on the quality of the measurement device but not the algorithm or tuning. Hence measurement arbitration is relatively simple, and easy to construct and tune. State arbitration such as integrator state arbitration, however, creates arbitration offset that depends on algorithm and tuning. As a result, it introduces additional feedback between the two ECUs. Significantly more effort needs to be spent on integrator state arbitration in order to make it work well. Integrator state arbitration can have other disadvantages, such as, single ECU control performance may not carry over to dual ECU and retuning may be required which can be time consuming. Further, when IMC or IMC arbitration fails, control algorithm has to change to one without integrator on one of the ECUs to maintain stability. This implies extra control algorithm and tuning, which is resource and time intensive.

The technical solutions described herein address the technical problem of the unstable redundant controllers by using a uniform tracking control technique to handle mismatching sensors, asynchronous ECUs and inter-micro communication under different failure scenarios. Accordingly, when using the technical solutions described herein, the tunings and performance carry over from a single ECU to dual ECU operation with no additional retuning required. Further, even if IMC or IMC arbitration fails, no control algorithm change or tuning change is required. Further yet, it should be noted that the technical solutions described herein are applicable for motor control systems operating in a Master-Master dual ECU configuration, and also for motor control systems operating in a Master-Slave configuration. This is particularly because in a Master-Slave configuration, when IMC fails, master ECU can no longer send commands to slave, and the Master-Slave automatically becomes a Master-Master configuration.

Integral control is used broadly for command following (or tracking) tasks in motor control systems due to its simplicity and its ability to improve low frequency response and drive steady state error to zero.

Figure 3:
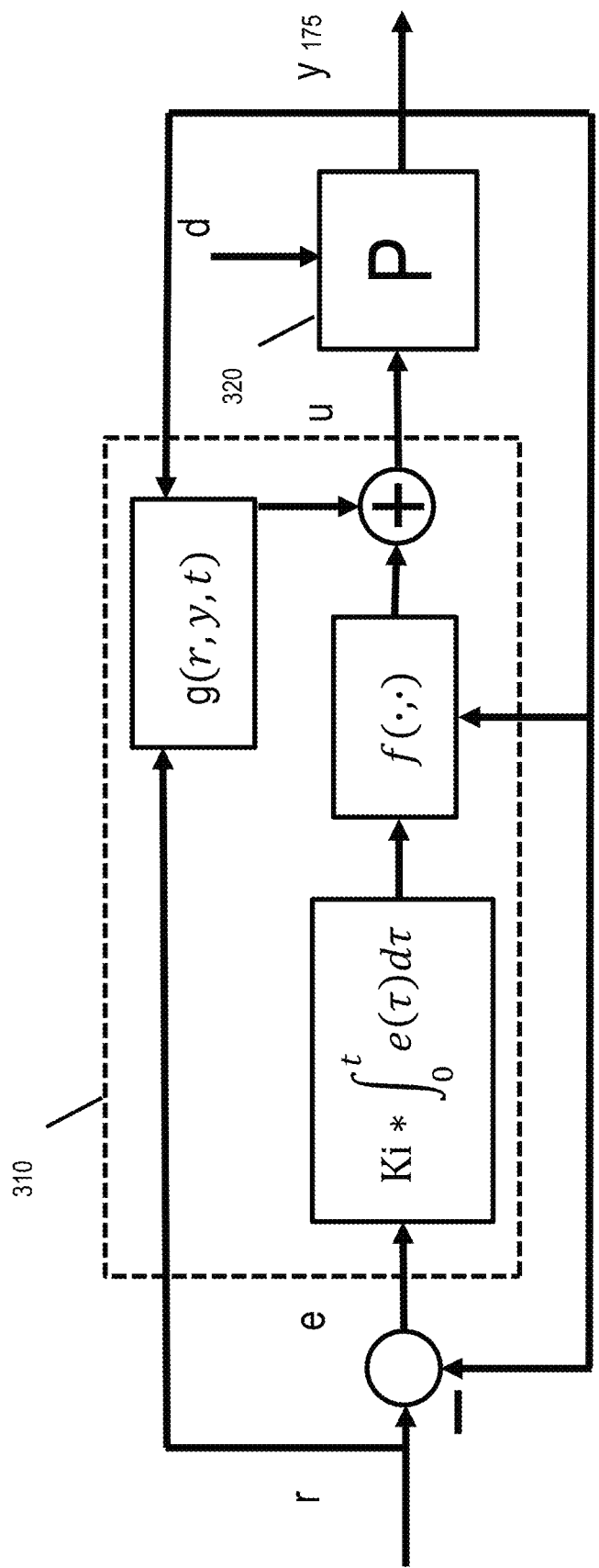
FIG. 3 shows a diagram of generic control algorithms with integral control according to one or more embodiments.

FIG. 3 shows a generic diagram of control algorithm containing Integral control (integrator) according to one or more embodiments. In FIG. 3 controller 310 is connected with plant or process P 320 in a closed loop, where r is the reference, y is the output of the plant 320, e is the tracking error, u is the control, d is the disturbance, and Ki is the parameter in controller 310. The controller 310 includes integral control, cascading control f and other additive controlling. The operation depicted in FIG. 3 is that of any of the independent ECUs in FIG. 1, with the plant P representing the motor connected with a physical system (for example, pinion, rack, tie rod, and road wheels) and the controller 310 being one of the controllers 110/120.

The integral controller 310 computes an output command u using the calculation:

$$u(t)=f(Ki*\int_0^t e(\tau)d\tau,\cdot)+g(r,y,t),\qquad\text{equation (1)}$$

where f represents a generic cascading control and g represents a generic additive control algorithm. For example f (x,·)=x and g=0, then controller 310 becomes an integrator, that is $u(t)=Ki*\int_0^t e(\tau)d\tau$. Without loss of generarity, we assume zero initial conditions. In s-domain, the integral control implemented in controller 310 can be written as $$\frac{Ki}{s}$$

in s domain (s is the Laplace variable). Here, the integrator state is the integral control $Ki*\int_0^t e(\tau)\,dr$ defined in equation (1).

The integrator in the controller 310 is marginally stable by itself. The integrator state defined above depends on the whole time history of e(t), other than only the steady state of e(t). In a single ECU system, the integrator can work in a stable way, however in the redundant ECU system 100, the integrator states from the two ECUs 110 and 120 may diverge from each other, which is called internally unstable.

FIG. 4 shows a diagram of the redundant system 100 including two ECUs 110/120 and two sensors 410. The plant P represent the motor 150, and the output y represents the pinion angle in EPS (or rack position in Steer-By-Wire), where $y_1$ and $y_2$ represents measurements from the redundant sensors 410. The control u is the final motor torque command 175 and is summation of motor torque command from both ECUs, i.e. $u=u_1+u_2$. The summation $u=u_1+u_2$ is realized mechanically as shown in FIG. 5. The controller 310 is the same as that in FIG. 3, control algorithm with integrator.

In the redundant system 100, the $r_1$ and $r_2$ are the redundant target angle commandA 112 and commandB 122, respectively. In one or more examples, the $r_1$ and $r_2$ can be received from path planning of an ADAS (or column position in Steer-By-Wire). Thus, the tracking errors $e_1$ and $e_2$ can be different so that $u_1$ and $u_2$ are different. In some cases, $u_1=-u_2$, which indicates that the motor current in each winding can be large but the corresponding motor torques cancel out each other so that the motor 150 generates heat but no work. Such case has to be avoided when designing a control strategy for the redundant system 100.

To make $u_1$ and $u_2$ to converge with each other, the $e_1$ and $e_2$ values are to be converged with each other. As noted earlier, existing techniques handle such converging of values using IMC arbitration. For example, the corrected errors can be $e_{1c}(t)=e_1(t)-[e_1(t)-e_2(t-\tau_1)]/2$ and $e_{2c}(t)=e_2(t)-[e_2(t)-e_1(t-\tau_2)]/2$. At steady state, $e_{1c}$ can be the same as $e_{2c}$, because there is no effect of IMC delays $\tau_1$ and $\tau_2$. However, the values are not equal in a dynamic case because of a delay in the IMC between the two ECUs 110/120. To avoid the IMC arbitration on integrator states, in some existing solutions, integral control is used in one ECU 110 (or 120) and a non-integral control strategy is used in the other ECU 120 (or 110). However, this requires additional tuning effort and the controls $u_1$ and $u_2$ can still differ from each other. Moreover, running different control strategies in the two ECUs 110/120 causes the overall tracking performance to be different under different failure cases.

The technical solutions described herein address the technical problem by using a uniform control strategy on both ECUs 110/12 to resolve the diverging controls technical problem without integrator state IMC arbitration. Moreover, with the uniform control strategy, control strategies do not have to be switched in different failure cases. The technical solutions accordingly facilitate at least similar tracking performance as the existing techniques with comparatively less tuning efforts.

Without loss of generality, we assume zero initial conditions. Then, the integral control in Equation (1) can be represented by $$\frac{Ki}{s}$$

in s domain, where s is the Laplace variable. The uniform control strategy instead uses pseudo/leaky integrator $$\frac{Ki}{s+\varepsilon},$$

where $\varepsilon>0$ is a configurable parameter. The value of $\varepsilon$ can be preconfigured. The larger $\varepsilon$ is, the faster $u_1$ and $u_2$ converge to each other, but the steady state error is larger. Accordingly, $\varepsilon$ can be tuned to a small positive number, such as [0.01, 0.5], due to the tradeoff. In one or more examples, $\varepsilon$ can be in the range (0, 1], due to the value of Ki and the accepted steady state error. The computation including the pseudo/leaky integrator state computation in time domain is as follows: (compare with Equation (1))

$$u(t)=f(Ki*\int_0^t e(\tau)\exp(\in\tau-\in t)d\tau,\cdot)+g(r,y,t) \quad \text{Equation (2)}$$

For example $f(x,\cdot)=x$ and $g=0$, then controller 310 becomes an pseudo/leaky integrator, that is $u(t)=Ki*\int_0^t e(\tau) \exp(\in\tau-\in t)d\tau$.

Using this control strategy, u1 and u2 converge to each other with arbitration only on controller input such as position target and measured position. Arbitration on integrator state is no longer needed for system stability and convergence between u1 and u2. Also, the control strategy can be run uniformly on both ECUs 110/120 under different failure scenarios. When there is an IMC failure, the control outputs u1 and u2 under the new control strategy do not diverge. Thus, it can continuously be used under IMC failure. The need for switching to a new set of controllers is avoided.

The resulting operation of the redundant ECU motor control system 100 using the uniform control strategy and same tuning in different scenarios yields substantially the same tracking performance.

Figure 6:
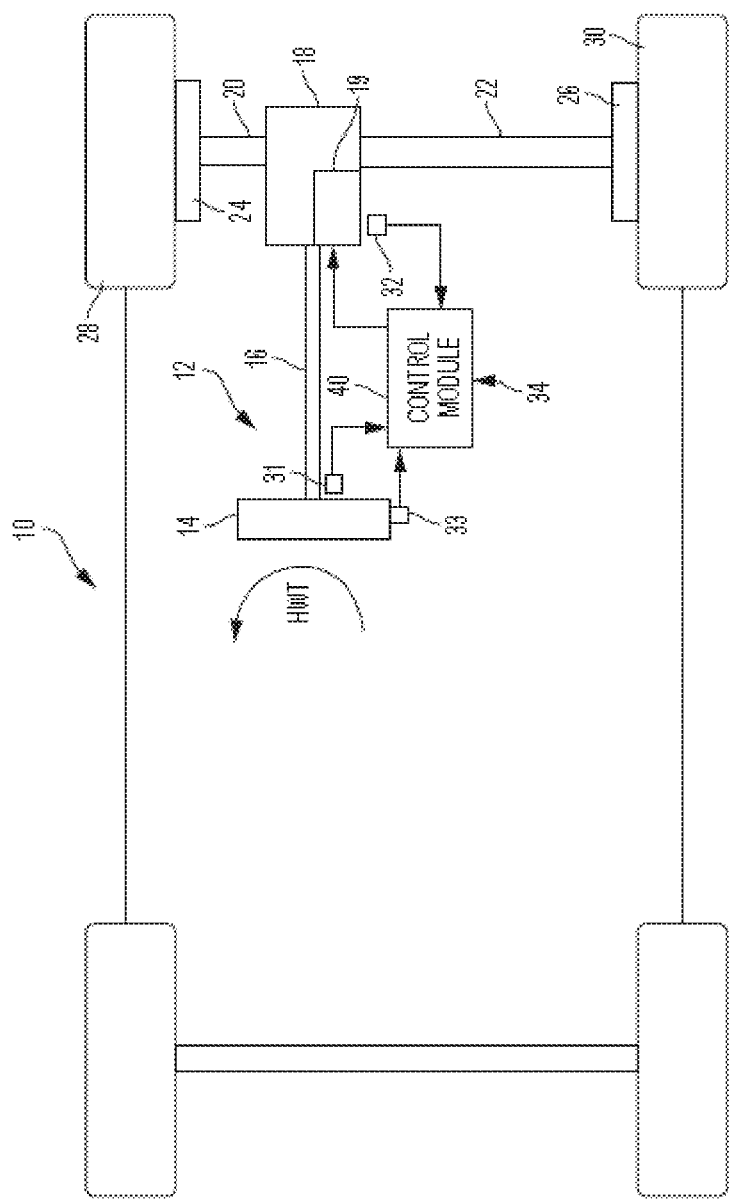
FIG. 6 depicts an exemplary embodiment of a vehicle including a steering system according to one or more embodiments.

Referring now to the FIG. 6 an exemplary embodiment of a vehicle 10 including a steering system 12 is depicted according to one or more embodiments. In one or more embodiments, the steering system 12 includes a handwheel 14 coupled to a steering shaft system 16 which includes steering column, intermediate shaft, and the necessary joints. In case of a steer by wire system, or an ADAS, one or more of the above listed mechanical components may be absent. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 6, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning as a control signal that can be used to control aspects of the steering system 12 through the steering assist unit 18.

The motor control system 100 may be part of the steering system 12, for example as being implemented by the steering assist unit 18, the control module 40, or any other module.

The technical solutions described herein provide an architecture of uniform control strategy for a redundant ECU system to converge separate torque commands without arbitrating an integrator state of the multiple controllers. The technical solutions further facilitate the multiple controllers to maintain consistent output commands removing the need for IMC arbitration between the multiple controllers.

The technical solutions described herein facilitate improving reliability of an electrical power steering system that uses two or more controllers and a closed loop integral action for redundancy purposes. The technical solutions described herein facilitate the multiple controllers to operate using a uniform control strategy regardless of failure cases or other variations, thus facilitating consistent outputs from the controllers. The technical solutions facilitate such results at costs lower than typical approaches, by eliminating tuning the controllers for different cases.

Further yet, the uniform control strategy for angle control in dual ECU motor control system 100 provides a simplified control architecture, i.e., no control algorithm change or tuning change is required, when IMC or IMC arbitration fails. Also, less tuning efforts and consistent tracking performance is achieved, i.e., tunings and performance carry over from single ECU to dual ECU operation with no retuning required.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions has been described in detail in connection with only a limited number of examples, it should be readily understood that the technical solutions is not limited to such disclosed examples. Rather, the technical solutions can be modified to incorporate any number of variations, alterations, substitutions or equivalent arrangements not heretofore described, but which are commensurate with the spirit and scope of the technical solutions. Additionally, while various examples of the technical solutions have been described, it is to be understood that aspects of the technical solutions may include only some of the described examples.

Accordingly, the technical solutions is not to be seen as limited by the foregoing description.

What is claimed is:

1. A motor control system comprising:
a first controller computing a first torque command using a first closed loop, wherein the first controller is designated as a master controller;
a second controller, that operates independent of the first controller, computing a second torque command using a second closed loop, wherein:
the second controller is designated as a master controller;
the first controller and the second controller include redundant controllers; and
both the first controller and the second controller computing the respective first torque command and the second torque command using a uniform calculation in which a leaky integrator $$\frac{Ki}{s+\varepsilon}$$

in s domain (s is Laplace variable) is used, and integrator state is calculated as $Ki*\int_0^t e(\tau)\exp(\varepsilon\tau-\varepsilon t)d\tau$, in time domain, which is implemented by discretization in an electric control unit (ECU), where e is a tracking error, Ki is a predetermined integral parameter, and $\varepsilon$ is a configurable parameter and is selectively tunable between a value of 0 and 1; and
a motor receiving a torque command for generating corresponding amount of torque based on the first torque command and the second torque command.

2. The motor control system of claim 1, wherein the torque command is a sum of the first torque command and the second torque command.

3. The motor control system of claim 2, wherein the first torque and the second torque are applied to a shaft being operated by the motor.

4. The motor control system of claim 1, wherein the first controller operates using a first input signal directed to the first controller and the second controller operates using a second input signal directed to the second controller.

5. The motor control system of claim 4, wherein the first input signal comprises a first measurement directed to the first controller, and the second input signal comprises a second measurement directed to the second controller.

6. The motor control system of claim 5, wherein the first measurement is received from a first sensor that is part of the first closed loop of the first controller, and the second measurement is received from a second sensor that is part of the second closed loop of the second controller.

7. The motor control system of claim 6, wherein the first measurement is measured by the first sensor at a first time-point and the second measurement is measured by the second sensor at a second time-point.

8. A method for operating a motor control system that includes two or more controllers, the method comprising:
receiving, by a first controller, a first input for computing a first torque command, wherein the first controller is designated as a master controller;
receiving, by a second controller that operates independent of the first controller, a second input for computing a second torque command, wherein the second controller is designated as a master controller, and wherein the first controller and the second controller include redundant controllers;

computing, by both the first controller and the second controller, the respective first torque command and the second torque commands using a uniform calculation in which a leaky integrator $$\frac{Ki}{s+\varepsilon}$$

in s domain (s is Laplace variable) is used, and integrator state is calculated as $Ki*\int_0^t e(\tau)\exp(\varepsilon\tau-\varepsilon t)d\tau$, in time domain, which is implemented by discretization methods in electric control unit (ECU), where e is a tracking error, Ki is a predetermined integral parameter, and $\varepsilon$ is a configurable parameter and is selectively tunable between a value of 0 and 1; and generating, by a motor, a corresponding amount of torque based on a torque command using the first torque command and the second torque command.

9. The method of claim 8, wherein the torque command is a sum of the first torque command and the second torque command.

10. The method of claim 9, wherein the first torque and the second torque are applied to a shaft being operated by the motor.

11. The method of claim 8, wherein the first controller operates using a first input signal directed to the first controller and the second controller operates using a second input signal directed to the second controller.

12. The method of claim 11, wherein the first input signal comprises a first measurement directed to the first controller, and the second input signal comprises a second measurement directed to the second controller.

13. The method of claim 12, wherein the first measurement is received from a first sensor that is part of the first closed loop of the first controller, and the second measurement is received from a second sensor that is part of the second closed loop of the second controller.

14. The method of claim 13, wherein the first measurement is measured by the first sensor at a first time-point and the second measurement is measured by the second sensor at a second time-point.

15. An electric power steering system comprising:
a motor configured to generate an assist torque;
a first controller to generate a first control output for the motor using a first closed-loop control loop to generate the assist torque, wherein the first controller is designated as a master controller; and
a second controller, operating independent of the first controller, to generate a second control output for the motor using a second closed-loop control loop to generate the assist torque, wherein:
the second controller is designated as a master controller;
the first controller and the second controller include redundant controllers; and
both the first controller and the second controller computing the respective first control output and the second control output using a uniform $$\frac{Ki}{s+\varepsilon}$$

calculation in which a leaky integrator in s domain (s is Laplace variable) is used and integrator state is calculated as $Ki*\int_0^t e(\tau)\exp(\varepsilon\tau-\varepsilon t)d\tau$, in time domain, which is implemented by discretization methods in electric control unit (ECU), where e is a tracking error, Ki is a predetermined integral parameter, and $\varepsilon$ is a configurable parameter and is selectively tunable between a value of 0 and 1.

16. The electric power steering system of claim 15, wherein the motor receives a torque command, which is a sum of the first control output and the second control output.

17. The electric power steering system of claim 16, wherein the first controller operates using a first input signal directed to the first controller and the second controller operates using a second input signal directed to the second controller.

18. The electric power steering system of claim 17, wherein the first input signal comprises a first measurement directed to the first controller, and the second input signal comprises a second measurement directed to the second controller.

19. The electric power steering system of claim 18, wherein the first measurement is received from a first sensor that is part of the first closed-loop of the first controller, and the second measurement is received from a second sensor that is part of the second closed-loop of the second controller.

20. The electric power steering system of claim 19, wherein the first measurement is measured by the first sensor at a first time-point and the second measurement is measured by the second sensor at a second time-point.

* * * * *